Oct. 21, 1924.

R. C. PIERCE 1,512,794

TIRE BEAD CONSTRUCTION

Filed Jan. 21, 1922

Inventor
R. C. Pierce.
By
Atty.

Patented Oct. 21, 1924.

1,512,794

UNITED STATES PATENT OFFICE.

ROBERT C. PIERCE, OF AKRON, OHIO, ASSIGNOR TO JOHN R. GAMMETER, OF AKRON, OHIO

TIRE-BEAD CONSTRUCTION.

Application filed January 21, 1922. Serial No. 530,801.

*To all whom it may concern:*

Be it known that I, ROBERT C. PIERCE, a citizen of the United States, residing at Akron, in the county of Summit, State of Ohio, have invented certain new and useful Improvements in Tire-Bead Constructions, of which the following is a specification.

This invention relates to pneumatic tires, particularly those of the type having inextensible beads known in the art as straight-side tires. These tires have embedded in the lower edges of the tire casing a metallic reinforce, which is flexible but relatively inextensible. The reinforcing members are usually formed from wire, and are of two distinct types, one being an endless cable and the other being a tape or ribbon made of a number of small wires which are braided into a tape, the tape being wound for a number of convolutions. Around the inextensible foundation thus formed, is placed a mass of rubber, and the bead is then covered with fabric and semi-vulcanized as a ring which is of substantially triangular cross-section. The bead is then ready to be incorporated in the tire.

This invention relates especially to the type of bead having a wire tape or ribbon to give it inextensibility, it being the object of the invention to construct a wire tape or ribbon which shall meet the requirements of service better than former bead wires, and will be easier to manufacture and possess certain advantages over prior bead wires.

The form of bead wire in use prior to my invention was made from a plurality of small wires, usually of piano wire, which were braided into a tape on a braiding machine. In the finished tape each individual strand passes in diagonal lines back and forth across the entire width of the bead and the resultant tape had a certain amount of stretchability which is undesirable in bead wires, and the bead wires will sometimes turn over or curl. The manufacture of this wire tape required complicated machines which were the source of continued superintendence and repair owing to their numerous moving parts and their operation was slow and unsatisfactory.

By the improved form of wire tape here shown, the various difficulties and objections to the former type of bead wire have been overcome. The bead wire is easy to manufacture, requires simple machinery, and is not stretchable. The tape will lie flat under all conditions and will not curl or turn up, as with the former constructions, but will be as flexible as the old form of bead wire.

Other advantages could be enumerated for the new form of bead wire, shown and described in this application, and it will be understood that the invention may be embodied in different forms from that shown without departing from the invention.

In the drawings a preferred form of bead wire is disclosed and the method of manufacturing a complete endless bead therefrom is shown.

Figure 1:
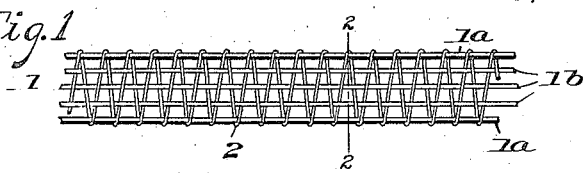
Fig. 1 is a view of a fragment of the bead wire or ribbon.
Figure 2:
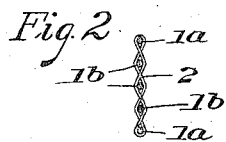
Fig. 2 is a cross-section thereof on the line 2—2 of Fig. 1.

Instead of forming the bead from a plurality of small wires braided together throughout the breadth of the wire, as in the former practice, I propose to use a number of parallel wires running the whole length of the ribbon. In the form shown in Fig. 1 are shown five wires 1, although the number may be increased or diminished, of which the outer wires $1^a$ may be of slightly thicker gage than the inner wires $1^b$, so that the edges of the tape may be strengthened somewhat, the central wires forming a filling. The outer wires $1^a$ may be made of higher carbon steel than the inner wires for additional strength. The several wires are held together in spaced relation by a comparatively light wire 2, which is woven back and forth from edge to edge of the tape whereby the wires are held in proper spaced relationship.

This wire tape constitutes the subject-matter of my invention, and it will readily be seen that it possesses several advantages over the former braided wire tape or ribbon. As the wires extend in circumferential lines about the bead, the strains extend directly along the wires and there is not found in the bead any extensibility as in former constructions. Furthermore, where eighteen or more wires were used in former constructions the total number of wires may be decreased making it possible to use a heavier wire with the same width of tape. In former constructions all of the wires were held in long undulations back and forth across the tape, which gave the bead tape its objectionable stretchability, and when the wire was coated or impregnated with rubber, this would often be squeezed out of the wire under tension. Larger interstices are afforded for the rubber to pass through and surround the wire and there is no opportunity for the wire tape to twist up or curl when pressure is exerted upon it. The cost of manufacture is materially reduced and the expensive and complicated machinery is not required as in the manufacture of braided wire tape. The machines to manufacture the improved form of wire tape can be operated at a higher rate of speed than is possible to operate the old form of braiding machines. Nor do the machines require the superintendence or upkeep of the old machines. In the braiding machines for the manufacture of the old form of tape, the wires were being constantly bent and twisted so that frequent breakage occurred, requiring constant watchfulness on the part of the operator. This objection is entirely obviated with the manufacture of wire tape of this improved form.

Figure 3:
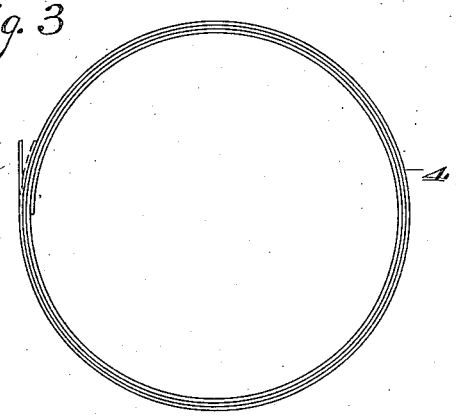
Fig. 3 is a view of several convolutions laid up ready for the reception of the other elements which go to make up a bead.
Figure 4:
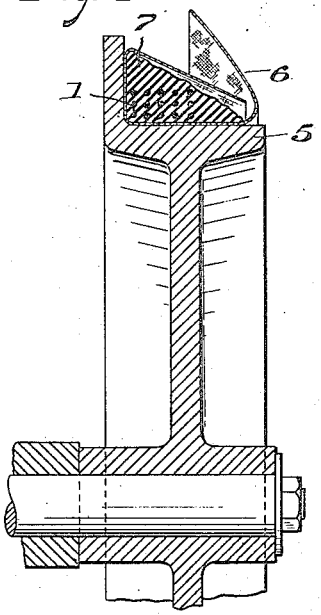
Fig. 4 is a cross-section of a portion of a drum on which the bead is built, with the bead about completed.

In the manufacture of tire beads with the improved form of wire tape or ribbon as a reinforcement, the wire tape may be coated or insulated with rubber, if desired by the tire manufacturer. However, as the new form of tape provides large interstices, this operation may be omitted. A ring or loop of wire is made up as shown in Fig. 3, with the required number of convolutions to give the strength desired. The ring is indicated by the numeral 4, the ends of the wire being fastened by any suitable tying device if desired, or by a touch of a soldering iron.

Figure 5:
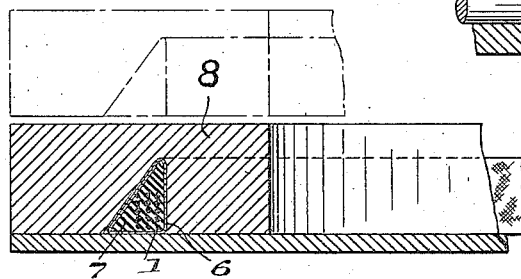
Fig. 5 is a view of the mold in which the bead is placed for the partial cure.
Figure 6:
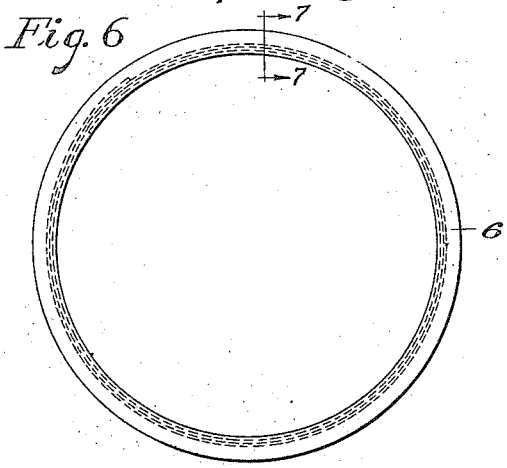
Fig. 6 is a side view of a complete bead.
Figure 7:
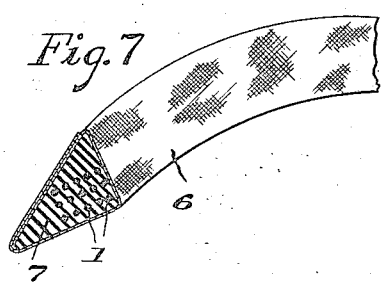
Fig. 7 is a fragmentary perspective view of the bead cut off on the line 7—7 of Fig. 6.

The ring is then placed on a form or wheel 5, which may have been used as a foundation for winding the ring, being located within a covering of fabric 6. A mass of rubber or rubber-like composition 7 is placed on the wire and the wrapping brought around the bead. The bead is then placed in a mold 8, Fig. 5, and given a partial vulcanization, which serves to bring the bead to correct shape, and to cause the rubber to flow into and around the wire. The bead is then in completed form so as to be incorporated in the tire structure.

It will be seen that the several advantages and improvements over the prior art are embodied in this bead structure; and having had the invention described, it is possible to obtain the benefits thereof in various modifications and variations which fall within the scope of the invention.

Claims:

1. As a new article of manufacture, a tire bead comprising a ring of rubber composition substantially triangular in cross-section and a reinforcing element parallel to one side of said bead, said reinforcing element comprising a wire tape of a number of parallel wires spaced apart at regular intervals across the tape and a crossing wire interwoven with the parallel wires for holding said parallel wires in fixed relationship.

2. As a new article of manufacture, a tire bead comprising a ring of rubber composition substantially triangular in cross-section and a reinforcing element located within the bead and adapted to impart inextensibility to the bead, said element being composed of a plurality of parallel wires, and a crossing wire interwoven with the parallel wires and serving to maintain them in fixed relationship.

3. A filler for the bead portion of a tire casing comprising a metallic reinforcement for imparting inextensibility to the bead, said reinforcement being formed from a plurality of single strand wires and a single crossing wire interwoven with the other wires and serving to maintain them in parallel relationship.

4. In a tire bead construction, a ring of rubber composition and a reinforcing element for said ring, said reinforcing element comprising a wire tape wrapped in a plurality of convolutions, said wire tape comprising a number of parallel wires.

5. In a tire bead construction, a ring of rubber composition and a reinforcing element for said ring, said reinforcing element comprising a wire tape wrapped in a plurality of convolutions, said wire tape being formed of a number of parallel wires and a single filling wire interwoven with said parallel wires.

6. A tire bead comprising a wire tape, said wire tape comprising a number of parallel wires arranged circumferentially of the bead and arranged at spaced intervals across the tape and a crossing wire interwoven with and adapted to hold said wires in parallel relationship, and a filling of rubber composition surrounding the tape and vulcanized thereto.

7. A tire bead comprising a ring of filling material and a wire tape embedded therein, said tape comprising a plurality of parallel wires spaced apart at intervals across the tape, the wires on the edges of the tape having greater tensile strength than the inner wires, and a wire woven back and forth across the parallel wires and serving to hold them in spaced relation.

8. A tire bead containing a wire tape to impart inextensibility thereto, said tape comprising a plurality of parallel wires and a wire passing back and forth from edge to edge of the tape and serving to maintain the wires in parallelism.

ROBERT C. PIERCE